US009160261B2

(12) United States Patent
Nishikimi

(10) Patent No.: US 9,160,261 B2
(45) Date of Patent: Oct. 13, 2015

(54) VARIABLE SPEED SWITCH

(75) Inventor: Junichi Nishikimi, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 200 days.

(21) Appl. No.: 13/882,327

(22) PCT Filed: Sep. 7, 2011

(86) PCT No.: PCT/JP2011/070329

§ 371 (c)(1), (2), (4) Date: May 29, 2013

(87) PCT Pub. No.: WO2012/063543

PCT Pub. Date: May 18, 2012

(65) Prior Publication Data

US 2013/0249463 A1 Sep. 26, 2013

(30) Foreign Application Priority Data

Nov. 11, 2010 (JP) ................................ 2010-252554

(51) Int. Cl.

| | |
|---|---|
| ***H02P 1/00*** | (2006.01) |
| ***H02P 1/28*** | (2006.01) |
| ***H02P 3/00*** | (2006.01) |
| ***H02P 7/06*** | (2006.01) |
| ***H02P 7/14*** | (2006.01) |
| ***H02P 23/00*** | (2006.01) |

(Continued)

(52) U.S. Cl.

CPC ... *H02P 6/08* (2013.01); *B25F 5/00* (2013.01); *H01H 15/16* (2013.01)

(58) Field of Classification Search

CPC .............. B25F 5/00; H01H 15/16; H02P 6/08
USPC .................................................. 318/494, 504
See application file for complete search history.

(56) References Cited

U.S. PATENT DOCUMENTS

| | | | | |
|---|---|---|---|---|
| 5,794,764 | A * | 8/1998 | Hirose et al. | 200/437 |
| 7,186,940 | B1 * | 3/2007 | Wong | 200/537 |

(Continued)

FOREIGN PATENT DOCUMENTS

| | | |
|---|---|---|
| GB | 2 328 630 A | 3/1999 |
| JP | A-62-37222 | 2/1987 |

(Continued)

OTHER PUBLICATIONS

International Search Report issued in International Application No. PCT/JP2011/070329 on Oct. 18, 2011 (with translation).

*Primary Examiner* — Kawing Chan
(74) *Attorney, Agent, or Firm* — Oliff PLC

(57) ABSTRACT

The variable speed switch according to the present invention is capable of outputting an electric signal for increasing or decreasing an amount of electric power supplied to the motor of an electric power tool according to a displacement amount of a switch-operating portion. The variable speed switch includes a wake-up contact configured to work when the switch-operating portion is operated and by which a voltage can be applied to a control circuit part of the motor to make the control circuit part in an operable state, and also includes a load sensor configured to receive a pressing force from the switch-operating portion by the displacement amount of the switch-operating portion after the operation of the wake-up contact is made and to output an electric signal according to the pressing force.

4 Claims, 7 Drawing Sheets

(51) Int. Cl.

| | |
|---|---|
| ***H02P 25/00*** | (2006.01) |
| ***H02P 27/00*** | (2006.01) |
| ***H02P 6/08*** | (2006.01) |
| ***B25F 5/00*** | (2006.01) |
| ***H01H 15/16*** | (2006.01) |

(56) References Cited

U.S. PATENT DOCUMENTS

2001/0025421 A1 10/2001 Damstra
2007/0200516 A1 8/2007 Miyazaki et al.
2010/0206703 A1* 8/2010 Puzio et al. ................ 200/61.85

FOREIGN PATENT DOCUMENTS

| | | |
|---|---|---|
| JP | A-4-3374 | 1/1992 |
| JP | A-7-220563 | 8/1995 |
| JP | A-11-123669 | 5/1999 |
| JP | A-2003-520696 | 7/2003 |
| JP | A-2003-260675 | 9/2003 |
| JP | B2-3812118 | 8/2006 |
| JP | A-2007-236029 | 9/2007 |

* cited by examiner

VARIABLE SPEED SWITCH

BACKGROUND OF THE INVENTION

1. Field of the Invention

The present invention relates to a variable speed switch mounted to an electric power tool and capable of outputting an electric signal for increasing or decreasing an amount of power supplied to the motor of the electric power tool according to a displacement amount of a switch-operating portion.

2. Description on of the Related Art

An electric power tool is generally provided with a wake-up switch for limiting power consumption of a battery. Owing to the wake-up switch, a power source of a control circuit part of a motor is shut off while the electric power tool is not being used.

Japanese Laid-Open Patent Publication No, 2003-260675 discloses an electric power tool in which a wake-up switch (contact) is incorporated into a variable speed switch. More precisely, the variable speed switch includes a switch main body portion provided with a trigger that can be pulled with a finger, a slide type variable resistor configured to operate in conjunction with a pulling operation of the trigger, and a wake-up switch (contact) incorporated into the switch main body portion. And, as shown in FIG. 11, in a state in which the trigger is pulled by a fixed amount L0 against the force of a spring, the wake-up switch (contact) is turned on, and a voltage is applied to a control circuit part. In this state, when the trigger is further pulled, the resistance value of a variable resistor varies in proportion to the pulling amount and the amount of electric power supplied to the motor can be increased or decreased by the control circuit part as the resistance value varies.

SUMMARY OF THE INVENTION

Problems to be Solved by the Invention

As shown in FIG. 11, in the above-described variable speed switch, the wake-up switch (contact) is turned on in the state in which pulling operation is made by the fixed amount L0, and a voltage is applied to the control circuit part. When the trigger is further pulled, the resistance value of the variable resistor varies in proportion to the pulling amount, and the amount of electric power supplied to the motor increases or decreases by the control circuit part as the resistance value varies.

That is, in the above-described variable speed switch, a stroke L0 for turning on the wake-up switch and also a stroke for operating the variable resistor are necessary, and thus an operational stroke of the variable speed switch will be large. For this reason, when the electric power tool is used for a long period of time, a finger is fatigued, resulting in deterioration in operability of the variable speed switch.

There is a need in the art to shorten an operational stroke of the variable speed switch having a wake-up contact, thereby improving operability of the variable speed switch.

SUMMARY OF THE INVENTION

A first aspect of the present invention provides a variable speed switch mounted to an electric power tool and capable of outputting an electric signal for increasing or decreasing an amount of electric power supplied to a motor of the electric power tool according to a displacement amount of a switch-operating portion. The variable switch includes a wake-up contact configured to work when the switch-operating portion is operated and by which a voltage is applied to a control circuit part of the motor to make the control circuit part in an operable state, and also includes a load sensor configured to receive a pressing force from the switch-operating portion by a displacement of the switch-operating portion after the operation of the wake-up contact is made and to output an electric signal according to the pressing force.

According to the first aspect, by operating the switch-operating portion, the wake-up contact first operates, and then the load sensor outputs an electric signal according to the pressing force of the switch-operating portion. As a result, the amount of power supplied to the motor of the electric power tool is increased or decreased, whereby the rotational speed of the motor is increased or decreased.

The load sensor is configured to output an electric signal according to the pressing force of the switch-operating portion, and thus it is possible to greatly reduce the displacement amount of the switch-operating portion as compared with the conventional slide resistance system. Thus, even if the electric power tool is used for a long period of time, a finger is not so fatigued, which improves operability of the variable speed switch.

According to a second aspect of the present invention, the pressing force from the switch-operating portion is applied to the load sensor via an elastic member.

Thus, a load that is applied to the load sensor from the switch-operating portion does not become larger than expected, which makes it possible to prevent damage of the load sensor.

According to another aspect of the present invention, the wake-up contact includes a balance-like member supported so as to be rotatable around a fulcrum, and also includes a receiving member configured to be brought into contact with and separated from the balance-like member by rotation of the balance-like member around the fulcrum. The wake-up contact is configured to turn on when the balance-like member comes into contact with the receiving member and to turn off when the balance-like member is separated from the receiving member. Also, a pressing portion formed in the switch-operating portion is configured such that a pressing position of the pressing portion with respect to the balance-like member changes by the displacement of the switch-operating portion, and the balance-like member is rotated in the on direction or in the off direction around the fulcrum.

According to another aspect of the present invention, the wake-up contact includes a first fixed conductor, a second fixed conductor, and a sliding conductor configured to operate in conjunction with the switch-operating portion. The first and second fixed conductors are provided on the same plane and the sliding conductor is slidable on the first and second fixed conductors. And also, the sliding conductor brings the first fixed conductor and the second fixed conductor into electrical contact, and the wake-up contact is turned on.

According to another aspect of the present invention, the wake-up contact includes a pin-like member mounted to the switch-operating portion via an elastic member and capable of being axially displaced against the elastic force of the elastic member, and also includes a receiving member capable of being brought into contact with and separated from the pin-like member by the displacement of the switch-operating portion. And, the wake-up contact is turned on when the pin-like member comes into contact with the receiving member and is turned off when the pin-like member is separated from the receiving member.

According to the above, it is possible to shorten the operational stroke of the variable speed switch having a wake-up contact, and thus even when the electric power tool is used for a long period of time, a finger is not easily fatigued, thereby improving operability of the variable speed switch.

DETAILED DESCRIPTION OF THE INVENTION

Embodiment 1

Figure 1:
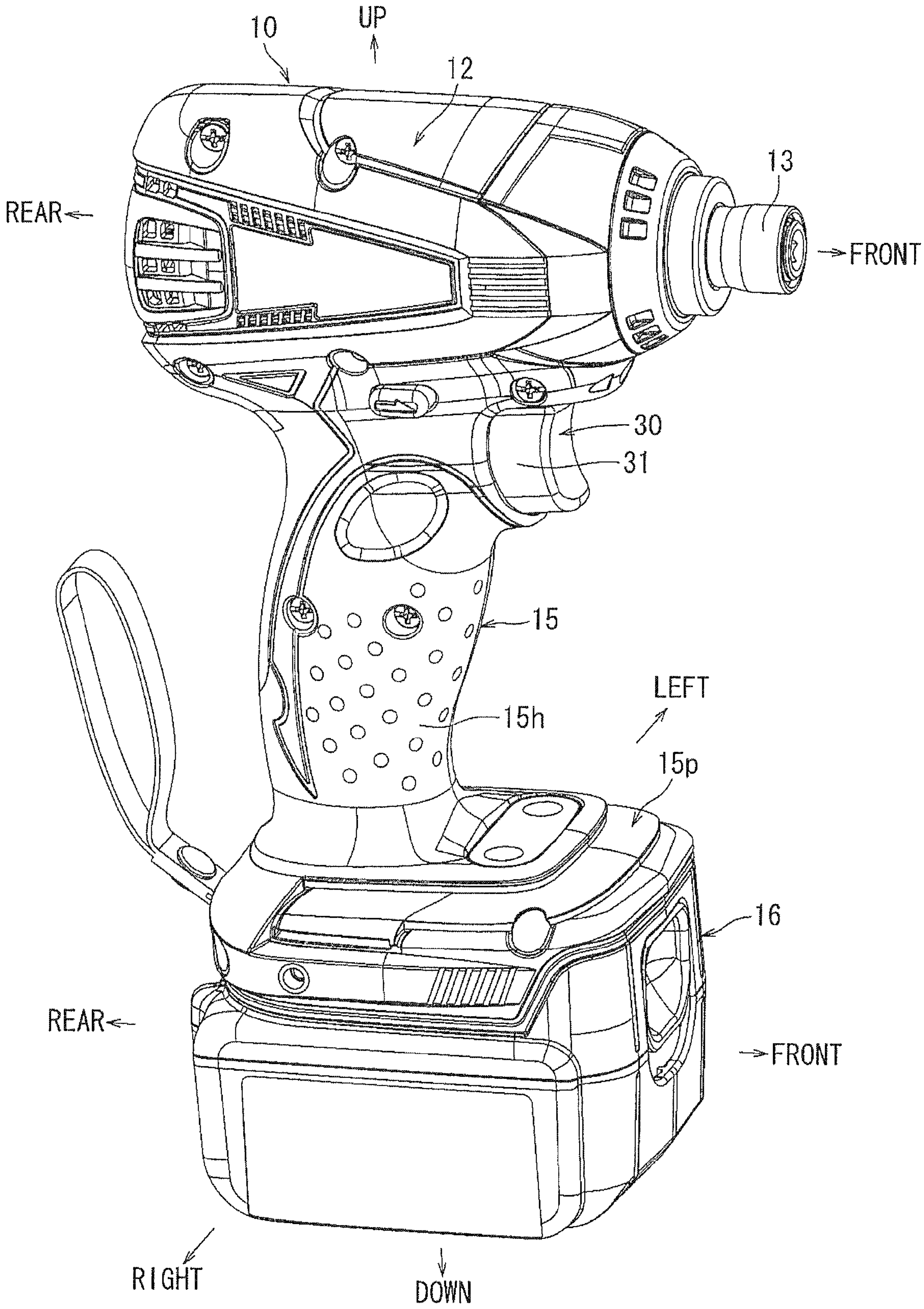
FIG. 1 An overall perspective view of an electric power tool provided with a variable speed switch according to an embodiment 1 of the present invention.

In the following, a variable speed switch 30 according to an embodiment 1 of the present invention will be described with reference to FIG. 1 to FIG. 10. The variable speed switch 30 according to the present embodiment can be used in an impact driver 10 (hereinafter termed the electric power tool 10), and configured to output an electric signal for increasing or decreasing an amount of electric power supplied to a DC motor 20 of the electric power tool 10 according to a displacement amount of a switch-operating portion (trigger 31).

Here, the front, rear, left, right, upper, and lower sides in the drawings correspond to the front, rear, left, right, upper, and lower sides of the electric power tool 10.

<Outline of the Electric Tool 10>

The electric power tool 10 according to the present embodiment is an impact driver (rotary striking tool) using a DC brushless motor 20 (hereinafter termed the DC motor 20) as the drive source.

As shown in FIG. 1, the electric power tool 10 includes a tubular housing main body portion 12, and a handle portion 15 formed so as to protrude from the lower portion of the housing main body portion 12. The handle portion 15 includes a grip portion **15*h* that can be held by a user when using the electric power tool 10, and also includes a battery connection portion 15*p* located on the lower side (distal end side) of the grip portion 15*h*. And, at the distal end portion of the grip portion 15*h*, there is provided the variable speed switch 30 that can be pulled by the user with a fingertip. Further, at the battery connection portion 15*p* of the handle portion 15, there is provided a connection mechanism (not shown) by means of which a battery 16 is connected to the battery connection portion 15*p***.

The DC motor 20 (refer to FIG. 2) is housed in the rear portion of the housing main body portion 12. Further, a drive device (not shown) including a planetary gear mechanism for increasing a rotational force of the DC motor 20, and a striking force generation mechanism, etc. are housed in front of the DC motor 20. And, an output shaft of the drive device is linked to a tool attachment portion 13 attached to the distal end position of the housing main body portion 12.

Figure 2:
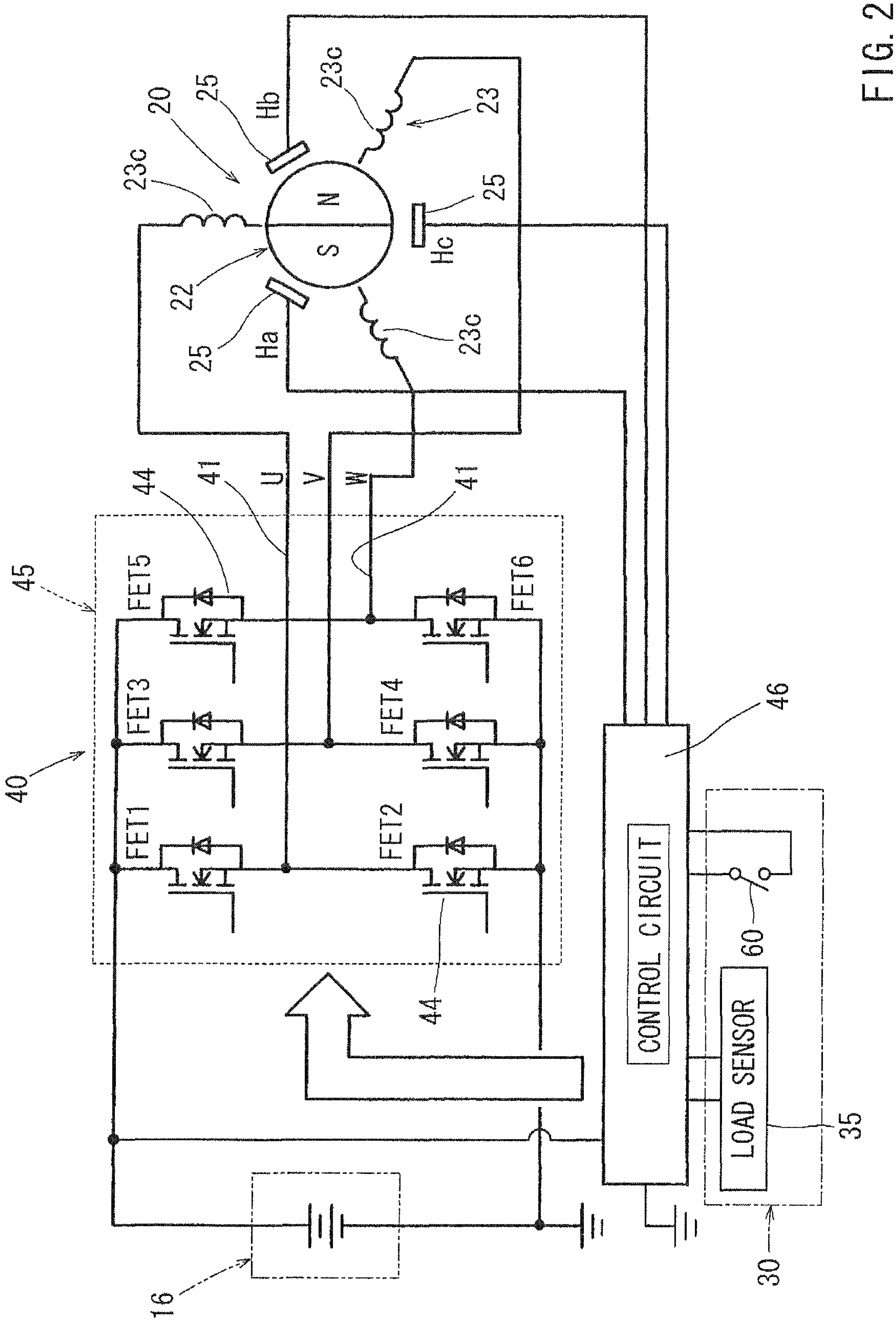
FIG. 2 A motor drive circuit diagram of the electric power tool.

As shown in FIG. 2, etc., the DC motor 20 includes a rotor 22 provided with a permanent magnet, a stator 23 provided with a drive coil **23*c*, and three magnetic sensors 25 for detecting the positions of the magnetic poles of the rotor 22**.

A motor drive circuit 40 drives the DC motor 20. As shown in FIG. 2, the motor drive circuit 40 includes a three-phase bridge circuit part 45 formed by six switching elements 44 (FETs), and also includes a control circuit part 46 configured to control the switching elements 44 of the three-phase bridge circuit part 45 according to an electric signal from the variable speed switch 30.

The control circuit part 46 controls the switching elements 44 of the three-phase bridge circuit part 45 according to a voltage signal (a pulling amount of the trigger 31) of the variable speed switch 30. The control circuit part 46 includes electrical components such as a microcomputer and ICs. Further, as described below, an ON/OFF signal of a wake-up contact 60 provided on the variable speed switch 30 is input to the control circuit part 46. As described below, by inputting an ON signal, a power source voltage is applied to the control circuit part 46.

<About the Overall Construction of the Variable Speed Switch 30>

Figure 3:
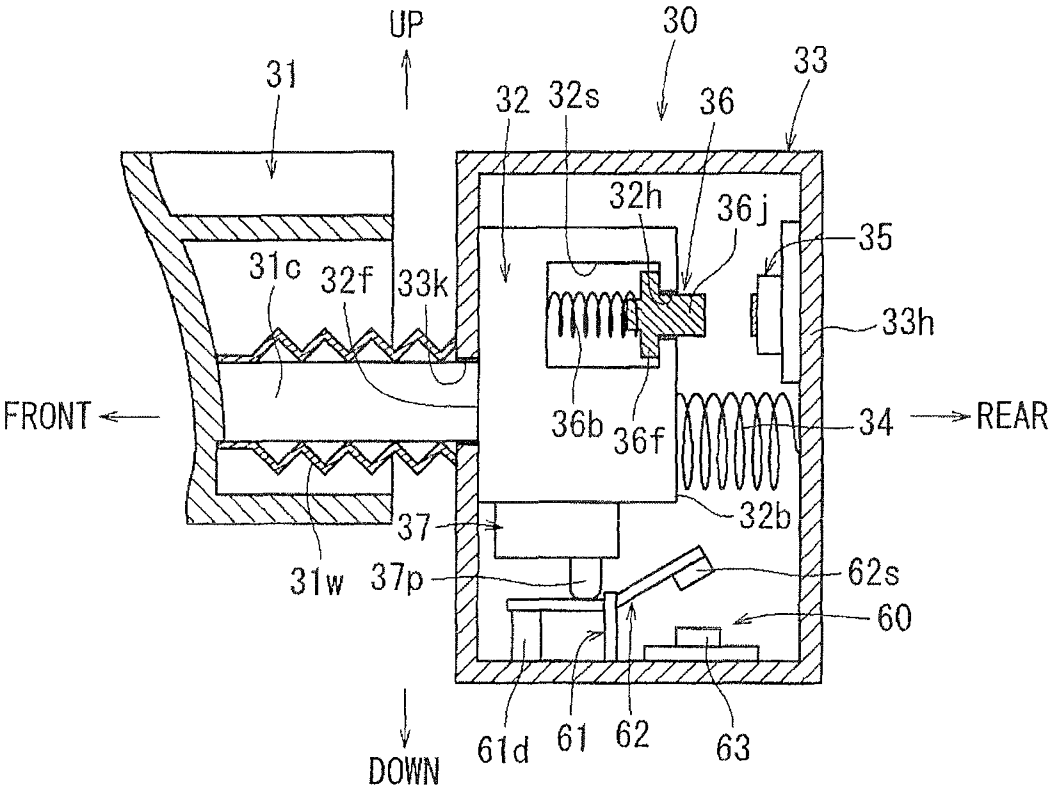
FIG. 3 A longitudinal sectional view of the variable speed switch.

As shown in FIG. 3, etc., the variable speed switch 30 includes the trigger 31 that can be pulled by the user with his or her fingertip, a switch main body portion 33 housed in the handle portion 15 of the electric power tool 10, a load sensor 35 provided in a housing **33*h* of the switch main body portion 33, and the wake-up contact 60**, etc.

The housing **33*h* of the switch main body portion 33 is formed as a container of a rectangular configuration viewed from the side, and a movable block 32 of a rectangular configuration viewed from the side is housed in the housing 33*h*. The movable block 32 is configured to operate in conjunction with the trigger 31, and is linked to the trigger 31 via a connection shaft 31*c*. More precisely, the rear end portion of the connection shaft 31*c* is fixed to a front surface central portion 32*f* of the movable block 32, and the front end portion of the connection shaft 31*c* is fixed to the back side of the trigger 31. And, the connection shaft 31*c* is slidably inserted into a through-hole 33*k* formed at the center of the front portion of the housing 33*h*. Further, the peripheral portion of the connection shaft 31*c* protruding forwards from the housing 33*h* is covered with a bellows-like dustproof cover 31*w*. Further, between a rear end surface 32*b* of the movable block 32 and an inner wall surface of the housing 33*h*, there is provided a first spring 34 biased to press the movable block 32 forward. As a result, the trigger 31 is held at an advancing limit position (original position) by the spring force of the first spring 34, and by pulling the trigger 31 against the spring force of the first spring 34, the movable block 32** is displaced backward.

<About the Load Sensor 35, etc. of the Variable Speed Switch 30>

The movable block 32 has a storage space **32*s* in which a pressing pin 36 configured to press the load sensor 35 can be housed, and in a rear wall of the storage space 32*s* there is provided an opening 32*h* through which a shaft portion 36*j* of the pressing pin 36 protrudes backward. The pressing pin 36 includes the shaft portion 36*j*, and a flange portion 36*f* provided at the proximal end portion of the shaft portion 36*j*, and the flange portion 36***f* is housed in the storage space 32*s* of the movable block 32. Further, inside the storage space 32*s* of the movable block 32, there is placed a second spring 36*b* that presses the shaft portion 36*j* of the pressing pin 36 in the backward direction.

The load sensor 35 is mounted to the rear inner wall surface of the housing 33*h* of the switch main body portion 33 at a position where the pressing pin 36 of the movable block 32 can be brought into contact with. As a result, when the movable block 32 is displaced backward by pulling the trigger 31, the pressing pin 36 of the movable block 32 is brought into contact with the load sensor 35 with the spring force of the second spring 36*b* being applied.

Figure 4:
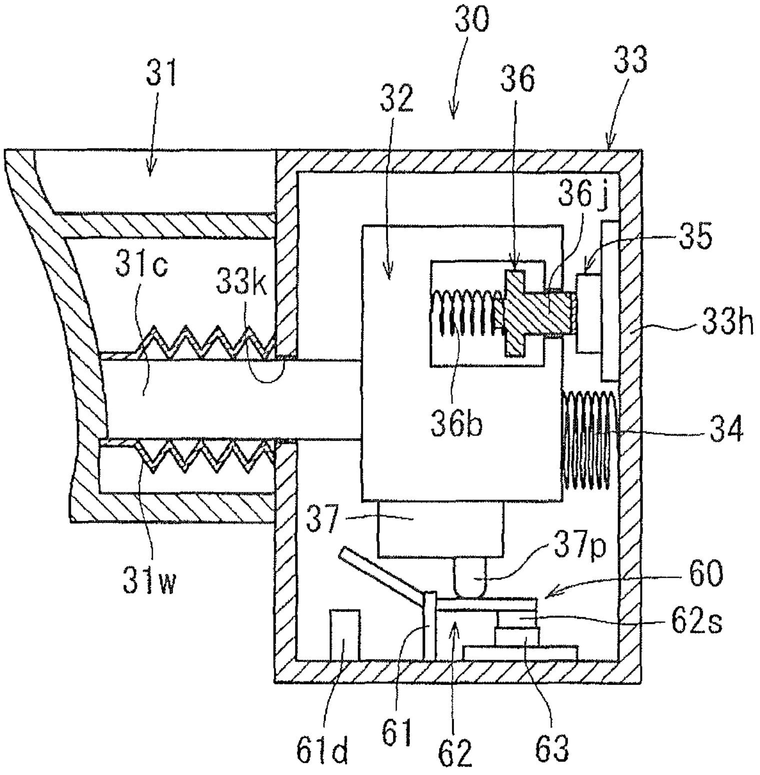
FIG. 4 A longitudinal sectional view of the variable speed switch.

That is, when the trigger 31 is pulled, the distal end of the pressing pin 36 is brought into contact with the load sensor 35 in a condition that the movable block 32 is displaced backward by a fixed amount (L0). And, as shown in FIG. 4, when the trigger 31 is further pulled, the pressing pin 36 receives a pressing reaction force from the load sensor 35, and is pushed into the storage space 32*s* of the movable block 32 against the spring force of the second spring 36*b*. That is, the spring force of the second spring 36*b* increases in proportion to the pulling amount of the trigger 31, and the spring force is applied to the load sensor 35 via the pressing pin 36.

Figure 5:
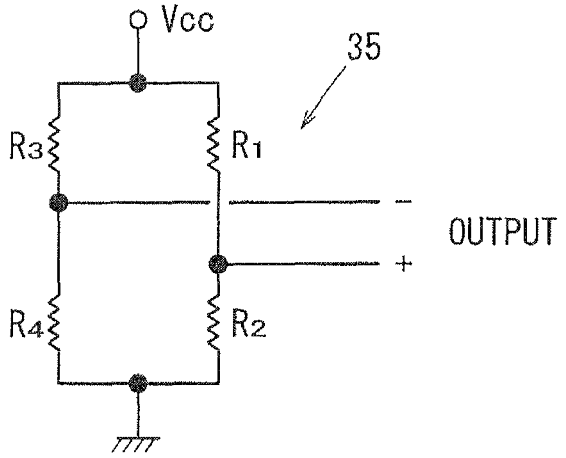
FIG. 5 A circuit diagram of a load sensor used in the variable speed switch.

As schematically shown in FIG. 5, the load sensor 35 can be represented by a resistor bridge circuit and is configured to be strained when the pressing force is applied from the pressing pin 36, and the resistance ratio of the bridge circuit varies in accordance with the amount of strain. Thus, when a predetermined voltage is applied to a power source terminal of the bridge circuit, a voltage signal proportional to the pressing force (the amount of strain) is output from the output terminal. That is, the load sensor 35 is capable of outputting an electric signal corresponding to the pulling amount of the trigger 31.

In this way, the trigger 31 and the movable block 32 etc. correspond to the switch-operating portion according to the present invention, and the second spring 36*b* corresponds to the elastic member according to the present invention.

<About the Wake-Up Contact 60 of the Variable Speed Switch 30>

The wake-up contact 60 is provided in the lower portion of the housing 33*h* of the switch main body portion 33. As shown in FIG. 3, the wake-up contact 60 is provided with a balance-like member 62 supported by a fulcrum 61 at the bottom portion of the housing 33*h* so as to be vertically rotatable around the fulcrum 61, a receiving member 63 provided at the bottom portion of the housing 33*h* and configured to bring into contact with and separate from the rear end contact portion 62*s* of the balance-like member 62, and a stand portion 61*d* capable of supporting the front end side of the balance-like member 62 from below. And, in the state in which the balance-like member 62 is supported by the stand portion 61*d*, the rear end contact portion 62*s* is separated from the receiving member 63, causing the wake-up contact 60 in the OFF condition (refer to FIG. 3). And, when the balance-like member 62 is rotated to the right around the fulcrum 61, the balance-like member 62 is separated from the stand portion 61*d*, and the rear end contact portion 62*s* is brought into contact with the receiving member 63, and then the wake-up contact 60 is turned on (refer to FIG. 4).

A pressing portion 37 configured to press the upper surface of the balance-like member 62 of the wake-up contact 60 is provided on the lower end surface of the movable block 32. The pressing portion 37 includes a pin portion 37*p* protruding downward from the pressing portion case thereof to bring contact with the upper surface of the balance-like member 62, and also includes a spring (not shown) for pressing the pin portion 37*p* downward. And, in the state in which the movable block 32 is held at the original position (advancing limit position) together with the trigger 31, the pin portion 37*p* of the pressing portion 37 presses the portion of the balance-like member 62 on the front side of the fulcrum 61, and the rear end contact portion 62*s* of the balance-like member 62 is separated from the receiving member 63 (OFF state). Further, when the trigger 31 is pulled to displace the movable block 32 backward, and the pin portion 37*p* of the pressing portion 37 presses the portion of the balance-like member 62 on the rear side of the fulcrum 61, the balance-like member 62 is rotated to the right around the fulcrum 61, and the rear end contact portion 62*s* brings into contact with the receiving member 63 (ON state).

The fulcrum 61 of the wake-up contact 60 and the pin portion 37*p* of the pressing portion 37 are arranged such that the wake-up contact 60 is turned on before the trigger 31 is pulled to cause the pressing pin 36 to bring into contact with the load sensor 35.

Figure 6:
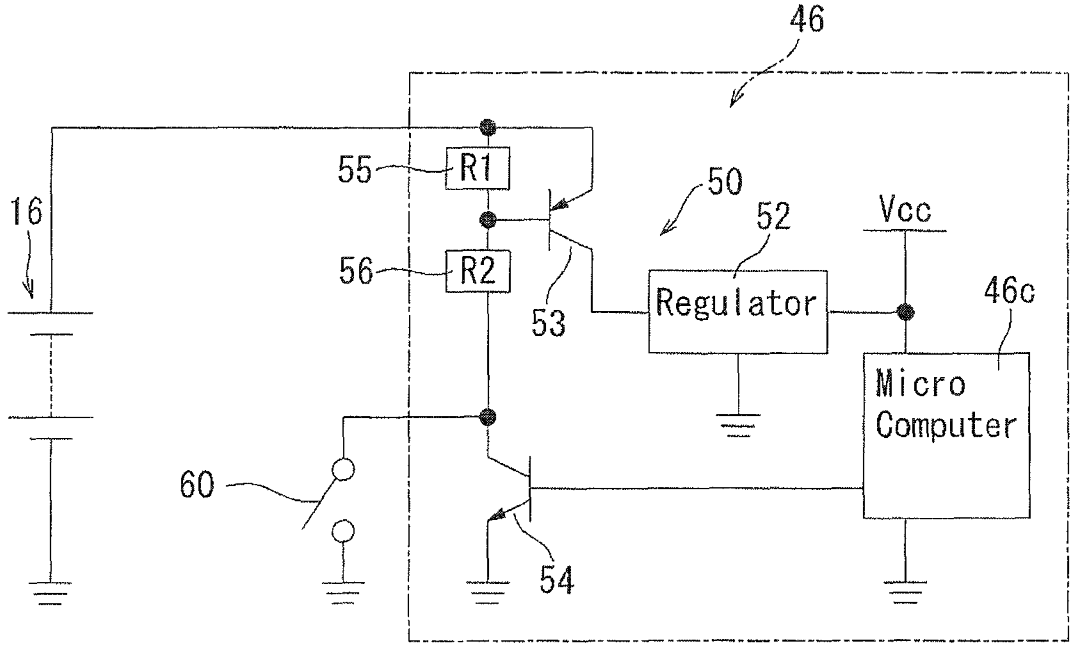
FIG. 6 A diagram showing an electric power source provided with a wake-up contact.

As shown in FIG. 6, the wake-up contact 60 is connected to a power source circuit 50 of the control circuit part 46. In FIG. 6, when the wake-up contact 60 is turned on, an electric current flows from a first resistor 55 and a second resistor 56 to the wake-up contact 60, and consequently a first transistor 53 is turned on (in a conductive state). As a result, a constant voltage is applied to a microcomputer 46*c* from a regulator 52, which causes the microcomputer 46*e* to start up. When the microcomputer 46*c* starts up, the microcomputer 46*c* turns on a second transistor 54. Consequently, even if the wake-up contact 60 is turned off, the first transistor 53 and the regulator 52 remain the ON state.

When the microcomputer 46*c* turns off the second transistor 54, the first transistor 53 and the regulator 52 are forced to turn off, and the power source of the microcomputer 46*c* is turned off.

<About the Operation of the Variable Speed Switch 30>

When the trigger 31 is pulled against the spring force of the first spring 34 from the original position, the movable block 32 is displaced backward together with the trigger 31.

The pin portion 37*p* of the pressing portion 37 of the movable block 32 is displaced backward with the upper surface of the balance-like member 62 of the wake-up contact 60 be pressed. And, in the state in which the trigger 31 is pulled by the fixed amount L0, the pin portion 37*p* of the pressing portion 37 presses the portion of the balance-like member 62 on the rear side of the fulcrum 61, and the balance-like member 62 is rotated to the right around the fulcrum 61 to turn on the wake-up contact 60. As a result, a voltage is applied to the control circuit part 46 as described above, and the microcomputer 46*c* is started up.

Figure 11:
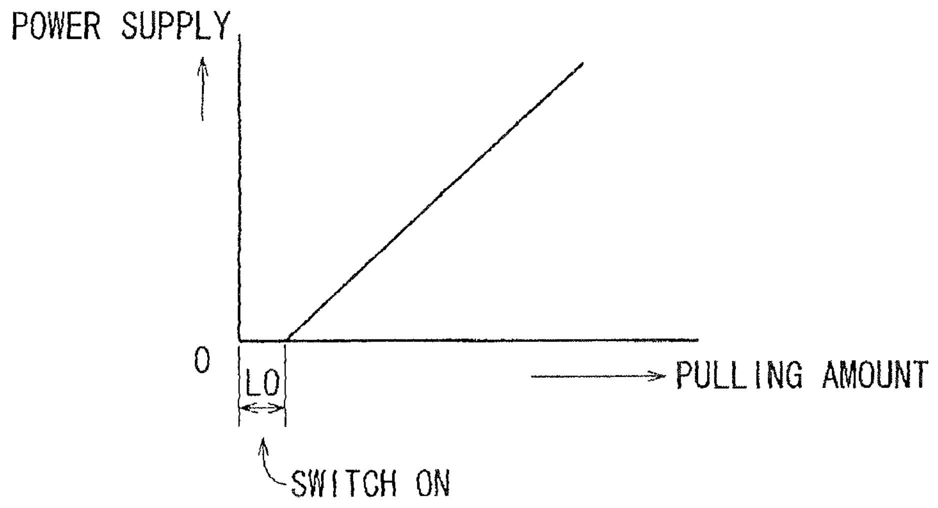
FIG. 11 PRIOR ART
FIG. 11 A graph showing an operation of the variable speed switch according to a prior art example of the electric power tool.

When the trigger 31 is further pulled, the distal end of the pressing pin 36 provided on the movable block 32 is brought into contact with the load sensor 35, and the pressing pin 36 presses the load sensor 35 under the spring force of the second spring 36*b*. As a result, the load sensor 35 outputs a voltage signal in proportion to the pulling amount (pressing force) of the trigger 31. And, the microcomputer 46*c* of the control circuit part 46 adjusts, through a PWM control, the power to be supplied to the DC motor 20 based on the output signal of the load sensor 35 (variable speed switch 30). That is, when the pressing force applied to the trigger 31 increases by pulling the trigger 31 of the variable speed switch 30, the output voltage of the variable speed switch 30 increases, and as shown in FIG. 11, the electric power supplied to the DC motor 20 increases due to the microcomputer 46*c* action. As a result, the rotational speed of the DC motor 20 increases.

In an opposite manner, when the pressing force applied to the trigger 31 is loosened, the output voltage of the variable speed switch 30 decreases, and the power supplied to the DC motor 20 decreases, which results in reduction in a rotational speed.

Further, when a pressing force is not applied to the trigger 31 any more, the microcomputer 46*c* turns off the second transistor 54, and then the power source of the microcomputer 46*c* is forced to turn off.

<Advantages of the Variable Speed Switch 30 according to the Present Embodiment>

In the variable speed switch 30 according to the present embodiment, when the trigger 31 is pulled, the wake-up contact 60 first operates, and then the load sensor 35 outputs an electric signal according to the pressing force of the trigger 31. As a result, the amount of electric power supplied to the DC motor 20 of the electric power tool 10 increases or decreases, and the rotational speed of the DC motor 20 increases or decreases.

The load sensor 35 outputs an electric signal according to the pressing force of the trigger 31, and accordingly the displacement amount of the trigger 31 can be greatly reduced as compared with that of the conventional slide resistance system. Thus, even if the electric power tool 10 is used for a long period of time, a user's finger is not so fatigued, which improves operability of the variable speed switch. Further, when the trigger 31 is returned to the original position, the electric power tool is not easily placed in a negative pressure state, thus making it difficult for dust or the like to enter the tool.

Further, the pressing force from the trigger 31 is applied to the load sensor 35 via the second spring 36*b*, and accordingly a load applied to the load sensor 35 caused by the trigger 31 does not become larger than expected, which prevents damage of the load sensor 35.

<Modifications>

Figure 7:
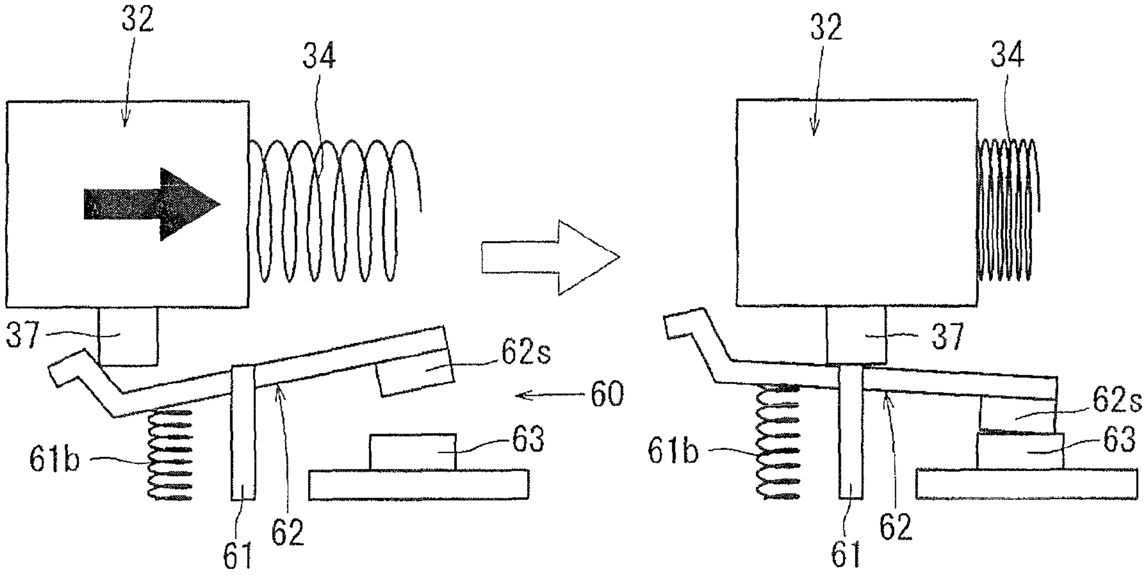
FIG. 7 A side view of a modification of the wake-up contact used in the variable speed switch.

The present invention is not restricted to the embodiment described above and may be modified without departing from the scope of the invention. For example, in the present embodiment described above, the front end side of the balance-like member 62 of the wake-up contact 60 is supported by the stand portion 61*d*, and the upper surface of the balance-like member 62 is pressed by the pin portion 37*p* under the spring force of the pressing portion 37. However, as shown in FIG. 7, it is also possible to form the pressing portion 37 as a protrusion, and to use a spring 61*b* biased to raise the front end side of the balance-like member 62 instead of the stand portion 61*d*.

Figure 8:
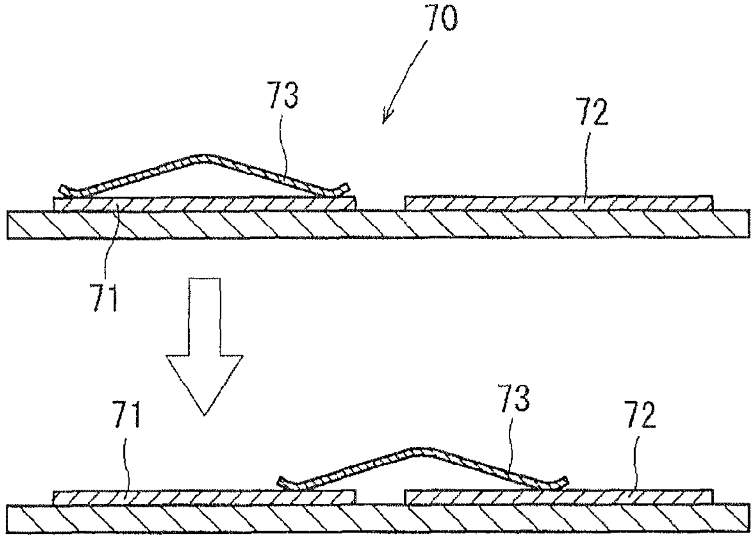
FIG. 8 A side view of a modification of the wake-up contact used in the variable speed switch.

Further, instead of forming the wake-up contact 60 by the fulcrum 61, the balance-like member 62, the receiving member 63, etc., it is also possible to form, as shown in FIG. 8, a wake-up contact 70 by a first fixed conductor 71, a second fixed conductor 72, and a sliding conductor 73 slidable on the fixed conductors 71 and 72, with the sliding conductor 73 being operated in conjunction with the trigger 31 (movable block 32).

Figure 9:
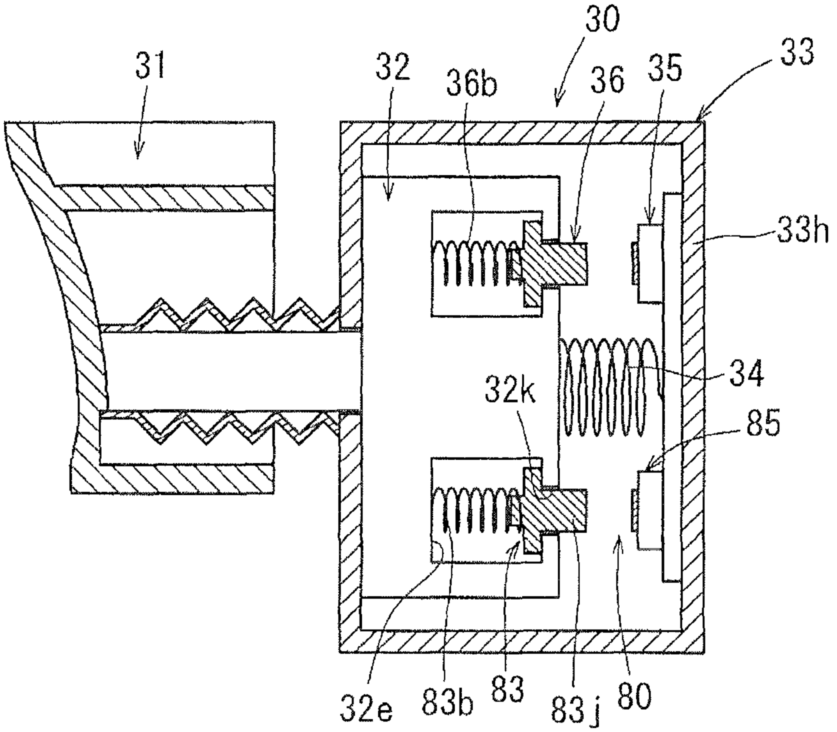
FIG. 9 A side view of a modification of the wake-up contact used in the variable speed switch.
Figure 10:
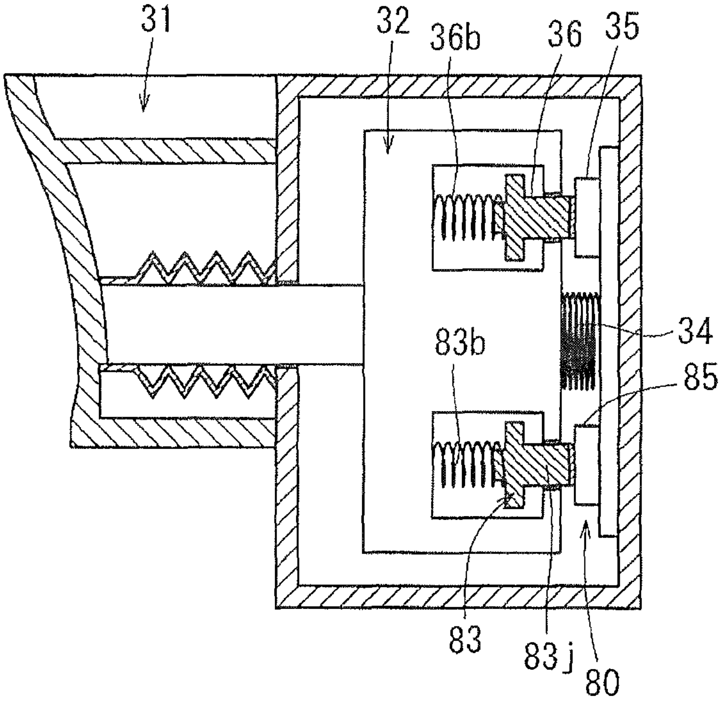
FIG. 10 A side view of a modification of the wake-up contact used in the variable speed switch.

Further, as shown in FIG. 9 and FIG. 10, it is also possible to form a wake-up contact 80 by a pin-like member 83 attached to the movable block 32, a receiving member 85 on the housing 33*h* side, etc. That is, the pin-like member 83 is a conductor of the same construction as the pressing pin 36 for pressing the load sensor 35, and a proximal end portion thereof is housed in a lower space 32*e* formed in the lower portion of the movable block 32. And, a shaft portion 83*j* of the pin-like member 83 protrudes backward from an opening 32*k* formed in the rear wall of the lower space 32*e*. Further, there is housed in the lower space 32*e* of the movable block 32 a third spring 83*b* biased such that the shaft portion 83*j* of the pin-like member 83 protrudes backward.

The receiving member 85 is mounted on the rear inner wall surface of the housing 33*h* of the switch main body portion 33, and is arranged in a position where the receiving member 85 can bring into contact with the shaft portion 83*j* of the pin-like member 83 of the movable block 32. In the state in which the shaft portion 83*j* of the pin-like member 83 is held in contact with the receiving member 85, the wake-up contact 80 is turned on, and, in the state in which the shaft portion 83*j* of the pin-like member 83 is separated from the receiving member 85, the wake-up contact 80 is turned off. The distance between the pin-like member 83 and the receiving member 85 of the wake-up contact 80 is configured to be smaller than the distance between the load sensor 35 and the pressing pin 36. Consequently, when the trigger 31 is pulled, the wake-up contact 80 is first turned on, and after that the load sensor 35 works.

In the variable speed switch 30 according to the present embodiment, coil springs are used in the first spring 34, the second spring 36*b*, and the third spring 83*b*. However, the first spring 34, the second spring 36*b*, and the third spring 83*b* may be changed to some other kind of springs as appropriate.

EXPLANATION OF SYMBOLS

10 . . . electric power tool
20 . . . DC motor
30 . . . variable speed switch
31 . . . trigger (switch-operating portion)
32 . . . movable block (switch-operating portion)
35 . . . load sensor
36 . . . pressing pin
36*b* . . . second spring (elastic member)
46 . . . control circuit part
60 . . . wake-up contact
61 . . . fulcrum
62 . . . balance-like member
63 . . . receiving member
70 . . . wake-up contact
71 . . . first fixed conductor
72 . . . second fixed conductor
73 . . . sliding conductor
80 . . . wake-up contact
83 . . . pin-like member
85 . . . receiving member

What is claimed is:

1. A variable speed switch mounted to an electric power tool and capable of outputting an electric signal for increasing or decreasing an amount of electric power supplied to a motor of the electric power tool according to a displacement amount of a switch-operating portion, comprising:

a wake-up contact configured to work when the switch-operating portion is operated and by which a voltage can be applied to a control circuit part of the motor to make the control circuit part in an operable state;

a pressing member that is attached to the switch-operating portion via an elastic member; and a load sensor that is configured to receive a pressing force from the pressing member and to output the electric signal for increasing or decreasing the amount of electric power supplied to the motor of the electric power tool, wherein the pressing member is spaced apart from the load sensor before the wake-up contact works.

2. The variable speed switch according to claim 1, wherein:

the wake-up contact includes a balance-like member supported so as to be rotatable around a fulcrum, and also includes a receiving member configured to be brought into contact with and separated from the balance-like member by rotation of the balance-like member around the fulcrum, the wake-up contact being configured to turn on when the balance-like member comes into contact with the receiving member and to turn off when the balance-like member is separated from the receiving member, and a pressing portion formed in the switch-operating portion is configured such that a pressing position of the pressing portion with respect to the balance-like member changes by the displacement of the switch-operating portion, whereby the balance-like member is rotated in the on direction or in the off direction around the fulcrum.

3. The variable speed switch according to claim 1, wherein:

the wake-up contact includes a first fixed conductor, a second fixed conductor, and a sliding conductor configured to operate in conjunction with the switch-operating portion, the first and second fixed conductors being provided on the same plane and the sliding conductor being slidable on the first and second fixed conductors, and the sliding conductor brings the first fixed conductor and the second fixed conductor into electrical contact, whereby the wake-up contact is turned on.

4. The variable speed switch according to claim 1, wherein:

the wake-up contact includes a pin-like member mounted to the switch-operating portion via an elastic member and capable of being axially displaced against the elastic force of the elastic member, and also includes a receiving member capable of being brought into contact with and separated from the pin-like member by the displacement of the switch-operating portion, and the wake-up contact is turned on when the pin-like member comes into contact with the receiving member and is turned off when the pin-like member is separated from the receiving member.

* * * * *